(12) United States Patent
Lundy et al.

(10) Patent No.: US 7,149,981 B1
(45) Date of Patent: Dec. 12, 2006

(54) METHOD AND SYSTEM FOR FACILITATING SELECTION OF A PORTION OF NON-FOCUSABLE OBJECT PRESENTED BY A BROWSER APPLICATION

(75) Inventors: Michael Lundy, Olathe, KS (US); Benjamin P. Blinn, Overland Park, KS (US); Robert H. Miller, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 779 days.

(21) Appl. No.: 10/345,812

(22) Filed: Jan. 16, 2003

(51) Int. Cl.
*G06F 3/00* (2006.01)

(52) U.S. Cl. ...................... 715/767; 715/802

(58) Field of Classification Search ........... 715/764, 715/767, 802; 709/203
See application file for complete search history.

(56) References Cited

U.S. PATENT DOCUMENTS

| | | | |
|---|---|---|---|
| 6,654,038 B1* | 11/2003 | Gajewska et al. | 715/802 |
| 6,683,626 B1* | 1/2004 | Abellera | 715/785 |
| 2002/0116416 A1* | 8/2002 | Tesch et al. | 707/516 |
| 2005/0114761 A1* | 5/2005 | Celik | 715/513 |

* cited by examiner

*Primary Examiner*—Kenneth R. Coulter (57) ABSTRACT

A client terminal may present focusable objects and non-focusable objects on a display screen. The focusable objects are objects selectable by a user, while the non-focusable objects are objects not selectable by the user. A client terminal may receive web content that defines a non-focusable object and present the web content on a display screen. Additionally, the client terminal may execute computer instructions for converting the non-focusable object into focusable objects. The client terminal may present the focusable objects on the display screen so that a user can scroll through one or more of the focusable objects, select, and copy the one or more of the focusable objects.

26 Claims, 10 Drawing Sheets

<Focusable: The> <Focusable: best> <Focusable: football> <Focusable: GAME> <Focusable: in> <Focusable: years>.
  \134

METHOD AND SYSTEM FOR FACILITATING SELECTION OF A PORTION OF NON-FOCUSABLE OBJECT PRESENTED BY A BROWSER APPLICATION

BACKGROUND

1. Field of the Invention

The present invention relates to telecommunications services and more particularly to a method and system for facilitating selection of a portion of a non-focusable object presented by a browser application.

2. Description of Related Art

A relatively recent advance in telecommunications technology is an ability for people to use a client terminal to communicate with others. The client terminal may be, for example, a cellular phone, pager, personal digital assistant (PDA), or portable computer.

The client terminal typically has a display screen and an input mechanism. The display screen allows for the client terminal to present text and graphics to a user. On the other hand, the input mechanism allows for the user to interact with the text and/or graphics presented on the display screen. The input mechanism typically takes the form of navigation keys and softkeys. The navigation keys may be arrow keys that allow the user to scroll a highlight up and down through options of a menu presented on the display screen. The softkeys, on the other hand, may be keys programmable by the client terminal to perform a variety of functions. The functions performable may be indicated by a label presented on the display screen above a respective softkey. For example, a softkey with the label "menu" may be actuated to allow for presenting a menu on the display screen. And a softkey with the label "select" may be actuated to indicate selection of a particular option within the menu.

The client terminal may execute a browser application to facilitate connectivity with the Internet. The browser application receives web content from a server on the Internet and displays the web content on the display screen of the client terminal. Additionally, the browser application sends web requests to the server on the Internet. The web requests instruct the server to, for example, send web content to the client terminal.

The web content that the browser application receives from the server may be segmented into units easily presentable on the display screen. These units are called cards. The cards are units of web content that are encoded in a markup language such as wireless markup language (WML), handheld device markup language (HDML), or compact hypertext markup language (cHTML). The markup language is a set of instructions that cause the browser application to present the web content on the display screen and to accept input from the user via the navigation keys and the softkeys.

The web content that the browser application presents on the display screen can be classified as either focusable objects or non-focusable objects. A focusable object is that web content selectable by the user. For example, a card may cause the browser application to display a menu on the display screen. Additionally, the browser application may allow the user to scroll through the menu and select, using the navigation keys and the softkeys, an option from the menu. As a result, an option defining the menu, in this instance, is a focusable object. On the other hand, a non-focusable object is that web content which cannot be selected by the user. For example, the browser application may present a card having text. The user can view the text, but the browser application might not to allow the user to select any portion of the text. As a result, the text, in this instance, is a non-focusable object.

The browser application presents web content as either focusable objects or non-focusable objects because of limitations inherent to the input mechanism. If the client terminal had a mouse, a track ball, or a touch screen as an input mechanism, then the user could indicate selection of an arbitrary point in the screen simply by "pointing and clicking." Instead, the navigation keys require scrolling a highlight or cursor, for example, sequentially through objects, e.g., menu options, presented on the display screen.

If the browser application was to present all web content in a card as focusable objects, then, to highlight a menu option of a menu, the user may have to actuate the navigation keys to scroll through a number of objects, not relating to the menu, just to select one of the menu options defining the menu. Instead of having to require the user to scroll through objects not related to the menu options of the menu, the browser application may present web content as either the non-focusable objects or the focusable objects. For example, the menu options may be the only focusable objects in the card so the user may actuate the navigation keys to directly scroll through the menu options, even though text is also presented by the browser application. Therefore, by the browser application presenting the web content as focusable objects and non-focusable objects, the user may have to scroll through a fewer number of objects to select a particular object, e.g., a menu option, presented by the browser application.

SUMMARY

A drawback to presenting web content as non-focusable objects is that the user cannot manipulate the non-focusable objects. For instance, a user may wish to copy a portion of text presented by the browser application into another application. If the text is presented as a non-focusable object, then the user cannot select a portion of the text, let alone copy the portion of the text into the other application. Instead, the user has to resort to manually entering the portion of the text into the other application using some type of text-entry scheme supported by the client terminal. Therefore, there exists a need for a method and system for facilitating manipulation of portions of non-focusable objects presented by the browser application.

In accordance with a principle aspect of the present invention, a client terminal may receive content, e.g., web content, that defines a non-focusable object. The client terminal may present the content on a display screen. Additionally, the client terminal may execute computer instructions for converting the non-focusable object into focusable objects. The client terminal may present the focusable objects on the display screen so that a user can scroll through one or more of the focusable objects, select, and copy the one or more of the focusable objects into a more permanent, fixed medium, e.g., memory or file storage. Additionally or alternatively, the client terminal may allow the user to copy the one or more of the focusable objects into an application, e.g., an e-mail application, an instant messaging application, or an editor.

The client terminal may convert the non-focusable object into one or more focusable objects by parsing the non-focusable object into parts. The parts may then be established as the focusable objects. For example, a block of text that is presented on the display screen as a non-focusable object may be parsed into parts in the form of words. The client terminal may establish, as the focusable objects, the words in the block of text. The client terminal may then present the focusable objects as a list of words or a block of text, for example, whereby the user can scroll through the list or the block of text to select one or more of the focusable objects.

A start indication and a stop indication may identify one or more of the focusable objects to be selected. For example, if the parts made focusable in the block of text is words, then the client terminal may allow the user to scroll a highlight or cursor to a first word in the block of text, i.e., start indication, and scroll the highlight or cursor to a second word in the block of text, i.e., stop indication. The focusable object or objects between the start indication and the stop indication may indicate to the client terminal, the focusable objects selected. The client terminal may copy the focusable objects selected into the more permanent, fixed medium. Additionally or alternatively, the client terminal may copy the focusable objects selected into the e-mail application, the instant messaging application, or the editor.

These as well as other aspects and advantages will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which.

DETAILED DESCRIPTION OF EXEMPLARY EMBODIMENTS

Figure 1:
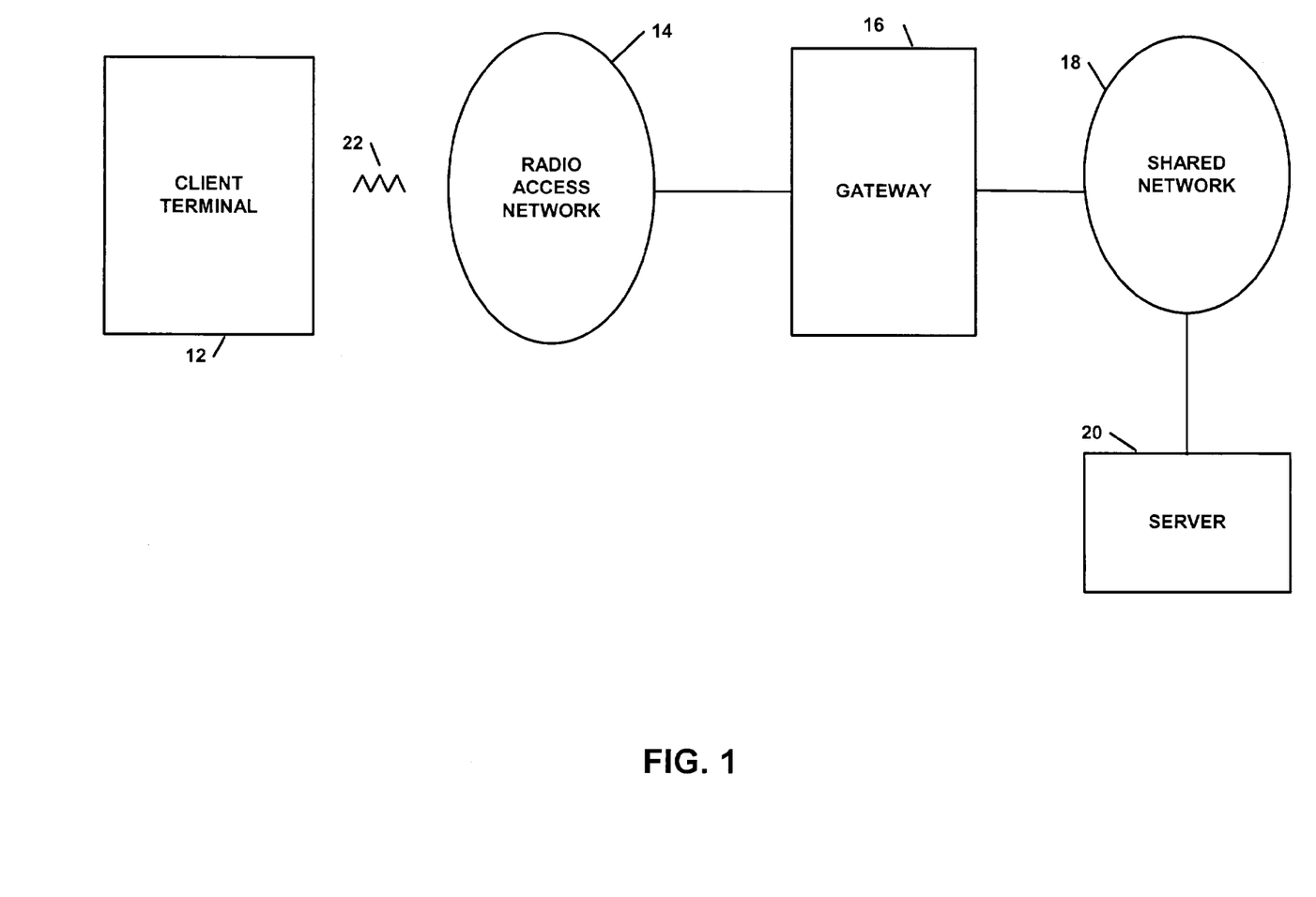
FIG. 1 illustrates a wireless network architecture.

Referring to the drawings, FIG. 1 illustrates a network architecture in which exemplary embodiments of the present invention may be employed. Those skilled in the art will appreciate that other network architectures can be used instead, additional elements may be added to these network architectures, and some elements may be omitted altogether. Further, as in most telecommunications applications, those skilled in the art will appreciate that many of the elements described herein are functional entities that may be implemented as discrete components or in conjunction with other components, in any suitable combination and location. Still further, the various functions described herein may be carried out by hardware or by a processor programmed to execute computer instructions, e.g., software or firmware, stored in memory. Provided with the present disclosure, those skilled in the art can readily design the specific hardware or prepare the computer instructions necessary to perform the various functions.

Referring to FIG. 1, the network architecture is shown to include a client terminal 12 that is communicatively coupled to a server 20. The client terminal 12 may be, for example, a cellular telephone, a pager, a personal digital assistant (PDA), or a portable computer. Indeed, the client terminal may also be any number of other devices that allows for communication with the server 20. The server 20 may be a shared computer capable of exchanging signals with multiple client terminals. Alternatively, the server 20 may be a collection of devices that together function as the shared computer. Other variations are also possible.

If the client terminal is a wireless device, then an air interface 22 may separate the client terminal 12 from a radio access network 14. The radio access network 14 may facilitate communication over the air interface 22. The radio access network 14 may include a base station that generates a radiation pattern over the air interface 22. The radiation pattern enables the client terminal 12 to exchange signals with the radio access network 14 over the air interface.

Of course, the network architecture might not include the radio access network 14, if, for example, the client terminal is a wired device such as a small computer coupled to a communication network (not shown). Instead, the wired device may be communicatively coupled directly to a gateway 16 or a shared network 18, through a landline access network such as a public switched telephone network (PSTN). Other arrangements are also possible.

Assuming the client terminal is a wireless device, however, the radio access network may be coupled to the gateway 16. The gateway 16 may facilitate exchange of web content between the radio access network 14 and the server 20. The gateway 16 may receive web content from the server 20 through the shared network 18, e.g., the Internet or an Intranet, and convert the web content into a format compatible with the client terminal 12. For example, the server 20 may send to the client terminal 12, web pages. The gateway 16 may convert the web pages into cards that can be presented on the client terminal 12. And then, the gateway 16 may forward the cards to the client terminal 12. Thus, the client terminal 12 need not have to convert the web pages into the cards, itself.

Of course, the gateway 16 may perform other functions in addition to, or instead of, those described herein. For example, in some cases, the gateway 16 might not need to convert the web content into another format. If, for example, the client terminal 12 is capable of converting the web content into another format or is capable of presenting the web content on the client terminal without needing to convert it into the other format, then the gateway 16 may simply pass the web content to the client terminal 12. The gateway 16 might not perform any conversion.

Figure 2:
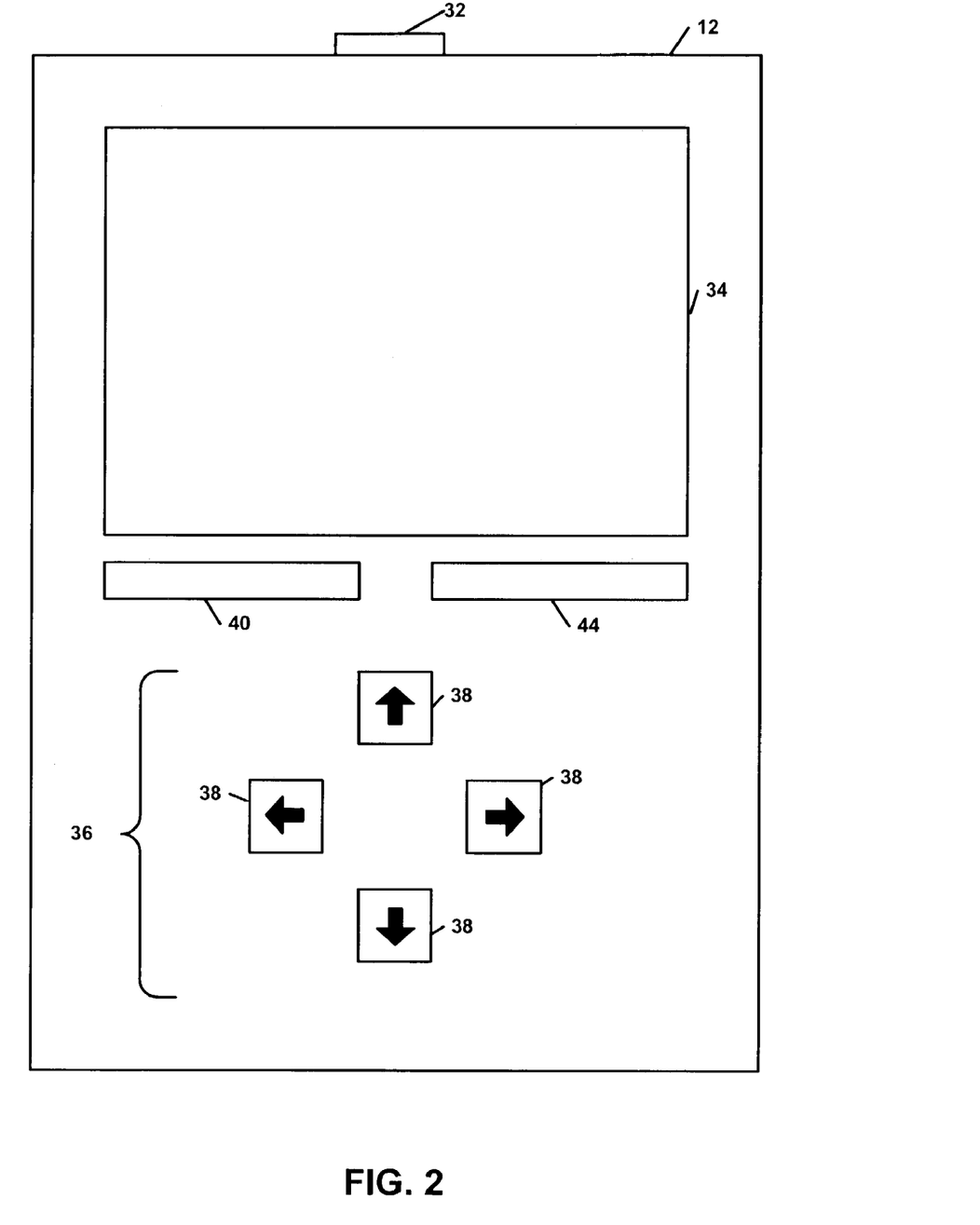
FIG. 2 illustrates an exemplary client terminal in a form of a wireless device.

FIG. 2 illustrates an exemplary embodiment of the client terminal 12. The client terminal 12 may be a processor-based device for sending web requests, for example, hyper-text transfer protocol (HTTP) get requests, to the server 20 and receiving web content, for example, cards, from the server 20.

The client terminal 12 may have a communication port 32, a display screen 34, and an input mechanism 36. The communication port 32 may be defined by, for example, an antenna or an infrared transmitter/receiver. The communication port 32 may allow for transmitting and receiving signals with the base station of the radio access network 14.

The signals may define the web requests sent to the server 20 and the web content received from the server 20. On the other hand, the display screen 34 may be an LCD screen, a CRT screen, or any other screen which displays the web content defined by the signals. The web content may be displayed on the display screen 34 as text and/or graphics, but of course other arrangements are also possible.

The input mechanism 36 may allow the user to interact with the client terminal 12. For example, the user may use navigation keys 38 in the form of arrow keys to scroll a highlight or cursor, for example, displayed on the display screen through objects, e.g., menu options, graphics, characters, words, defining web content displayed on the display screen 34. And the user may press programmable softkeys 40, 44 to instruct the client terminal 12 to perform a particular function. The particular function may be indicated by a label above a respective softkey. Optionally, the client terminal 12 may also have a text-entry keypad which the user can use to enter characters, e.g., letters and/or numbers, into the client terminal 12. The text-entry keypad may be integrated or separate from the client terminal 12. For example, the text-entry keypad may be a physical keypad connected to the client terminal 12. Additionally or alternatively, the text-entry keypad may be a virtual keypad presented on a touch sensitive display screen. The user may touch respective keys of the virtual keypad to enter text into the client terminal 12.

As one skilled in the art will appreciate, the input mechanism 36 may take other forms in addition to that described herein. The input mechanism 36 could be associated with something else other than navigation keys. All such modifications and equivalents which fall within the spirit and scope of the exemplary embodiments of the present invention are included herein.

Figure 3:
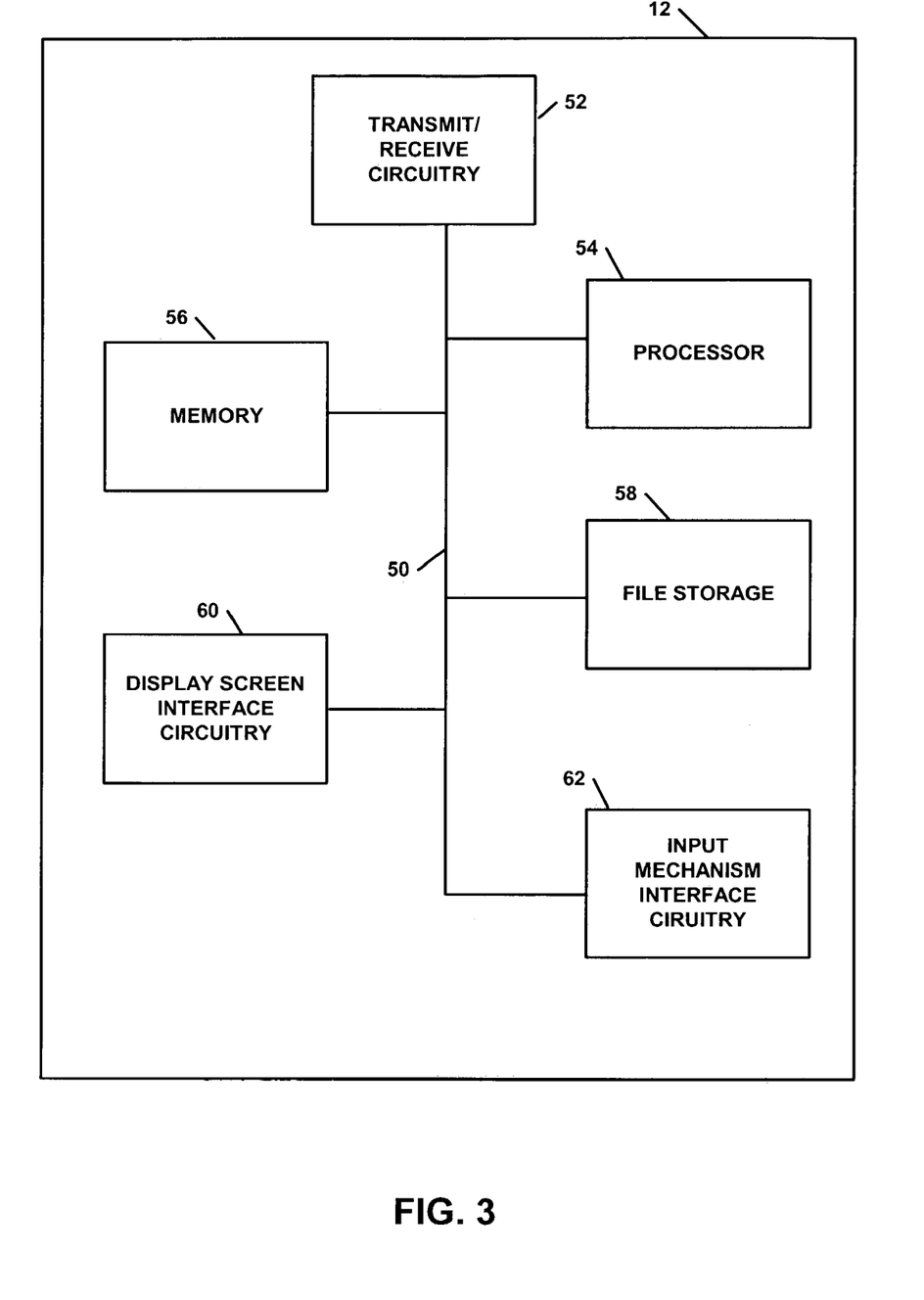
FIG. 3 illustrates an internal architecture of the exemplary client terminal.

FIG. 3 illustrates an exemplary internal architecture of the client terminal 12. The client terminal 12 may have a bus 50 which communicatively couples a processor 54, memory 56, file storage 58, transmit/receive circuitry 52, display screen interface circuitry 60, and input mechanism interface circuitry 62. Other devices, of course, may be coupled to the bus 50. In addition, some of the devices coupled to the bus may be combined, for example, the processor 54 and the memory 56.

The processor 54 may be capable of executing computer instructions stored in the memory 56 or in the file storage 58. For example, the computer instructions may define a browser application that presents web content on the display screen 34 and that responds to actuation of the input mechanism 36. The memory 56, for example, random access memory (RAM), may be a temporary storage area for the computer instructions. On the other hand, the file storage 58, for example, a hard drive, may be a more permanent storage area for the computer instructions. Of course, the memory 56 and file storage 58 may take many other forms and is no way limited to either RAM or a hard drive, respectively.

The transmit/receive circuitry 52, display screen interface circuitry 60, and input mechanism interface circuitry 62 may allow for coupling the communication port 32, the display screen 34, and the input mechanism 36, respectively, to the bus 50. The transmit/receive circuitry 52 may facilitate transmitting signals to the communication port 32 and receiving signals from the communication port 32. The display screen interface circuitry 60 may facilitate the display of the web content on the display screen 34. And the input mechanism interface circuitry 62 may allow for receiving input from the user, e.g., detection of the navigation keys 38 or the softkeys 40, 44 being actuated.

The server 20 may send web content to client terminal 12. The web content may be divided, for example, by the gateway 16, into units presentable on the display screen. The units presentable on the display screen are the cards. Each card is a set of markup language instructions that program the browser application to present the web content defined by the card on the client terminal 12. Additionally, the markup language instructions may cause the browser application to respond to actuation of the input mechanism 36. Of course, the web content as received and presented by the client terminal 12 may take other forms such as web pages or data files. The forms that the web content takes may depend on functionality of the gateway 14 and capabilities of the browser application.

Figure 4:
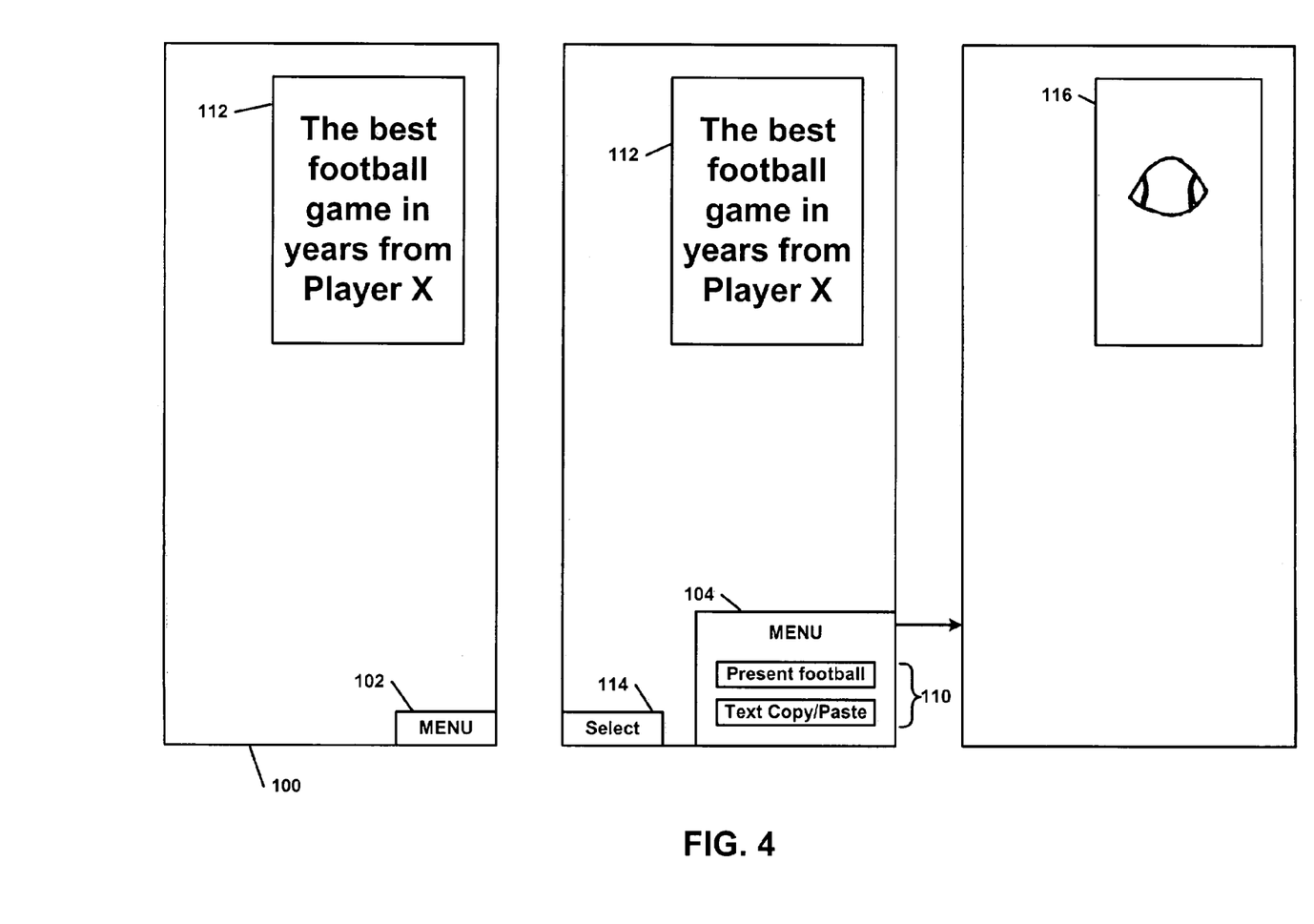
FIG. 4 illustrates exemplary cards that are presented on the client terminal.

FIG. 4 illustrates an exemplary card 100 that the server 20 may send to the client terminal 12. The browser application may be programmed to present the web content defined by the card 100 on the display screen 34. The web content may be presented as focusable objects, non-focusable objects, or a combination of both focusable objects and non-focusable objects.

A focusable object may be web content that is selectable by the user. For example, the browser application may be programmed to present a label 102, which when viewed on the display screen 34, would be located above the softkey 44. The label 102 may indicate a function performable by the client terminal 12, for example, present a menu 104 in response to the softkey 44 being actuated.

The browser application may present choice-items of the menu 104 as focusable objects. The focusable objects may be web content selectable by the user. For example, the user may use the navigation keys 38 (i.e., up and down arrow keys) to scroll to a particular choice-item 110, e.g., "present football" under a highlight and select the particular choice-item 110 under the highlight by pressing the softkey 42. The softkey 42 may be under a label 114 that identifies that the softkey 42 is associated with selection of the choice-item. In response to actuation of the softkey 42, the browser application may perform a function associated with the particular choice-item 110 selected. The function may be to present an image of a football 116 on the display screen 34 or to perform a text copy/paste, as described below. Other arrangements are also possible depending on the particular choice-item 110 selected in the menu 104.

On the other hand, a non-focusable object may be web content that the user cannot scroll through or select. For example, the user might not be able to scroll a highlight through the block of text 112 or select any portion of block of text 112, such as words or sentences, using the navigation keys 38. Instead, the user might just be able to read the text. As such, the block of text 112 may be deemed non-focusable.

Of course, it should be appreciated that the card that is shown by FIG. 4 may take forms other than that illustrated. For example, the choice-items and the text may vary from those described above and may, for instance, depend on factors such as the subject matter and the user's language. And since the server 20 usually has control over the cards sent to the browser application, the server 20 may customize the choice-items as desired. As another example, the choice-items can be displayed in another format, such as a drop-down list or as graphical icons.

The cards presented by the browser application may be defined by a markup language. The markup language may program the browser application to present the web content defined by the card 100 as the focusable objects and the non-focusable objects. Typically, the markup language is tailored to a client terminal having a particular input mechanism. The navigation keys 38, for example, might not allow selection of an arbitrary point in the screen, i.e., "point-and-click", similar to what is allowed by a mouse, a track ball, or a touch screen. Instead, the navigation keys may require scrolling, i.e., moving sequentially, through objects, e.g., menu options, presented on the display screen 34. Since the client terminal might not be configured to allow a user to select an arbitrary point in the screen, the markup language defines which web content is to be presented by a browser application running on the client terminal as focusable objects and, similarly, which web content is to be presented by the browser application as non-focusable objects. For example, the markup language may define the menu options 110 as focusable objects in card 100, but not the block of text 112. As a result, the user need not have to scroll the highlight or cursor, using the navigation keys 38, through objects not related to the menu options 110, e.g., characters in the block of text, to highlight a particular menu option.

Figure 5:
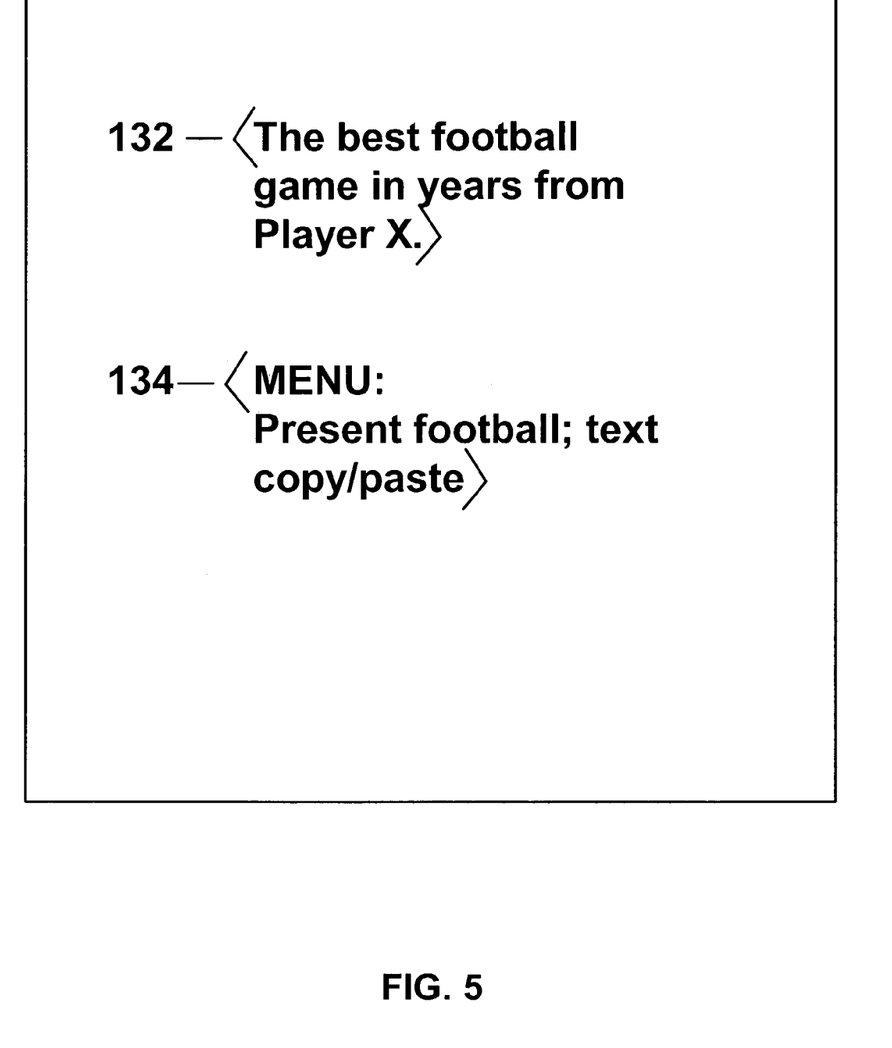
FIG. 5 illustrates exemplary markup language instructions that define the exemplary cards such as those illustrated in FIG. 4.

FIG. 5 illustrates exemplary markup language, which defines the web content of card 100 shown in FIG. 4. The markup language may include a tag, which indicates to the browser application to present an object associated with the tag as focusable. For example, the markup language may have a "menu" tag 134. The menu tag 134 may identify the menu 104 and choice-items 110 of the menu 104. By being associated with the "menu" tag 134, the browser application may be programmed to present the menu 104 and the choice-items 110 of the menu 104 as focusable objects.

In contrast, lack of a tag may indicate to the browser application that an object is to be presented as a non-focusable object. For example, a block of text 132 might not be associated with any tags. As a result, the browser application may be programmed to present the block of text 132 as a non-focusable object. And the user might not be able to select any portion of the block of text 132.

Other arrangements are also possible depending on a configuration of the browser application, the input mechanism on the client terminal, and the markup language being used. For example, the browser application may be programmed to display objects without a tag as being focusable. And the browser application may display objects with a tag as not being focusable. Alternatively, the browser application may display all objects as non-focusable. Still alternatively, the browser application may present all objects as being focusable, but portions of the object might still not be focusable. Other variations are also possible when the markup language is not even tag-based.

According to an exemplary embodiment of the present invention, the processor 54 of the client terminal 12 may execute computer instructions to convert an otherwise non-focusable objects into focusable objects. As a result of converting the non-focusable objects into the focusable objects, the user may be able to scroll through the once non-focusable object, select a portion of the once non-focusable object, and copy the portion into a fixed medium such as the memory 56 or the file storage 58. Additionally or alternatively, the user may be able to copy and perhaps paste the portion into another application, such as an e-mail, an instant message, or an editor.

Figure 6:
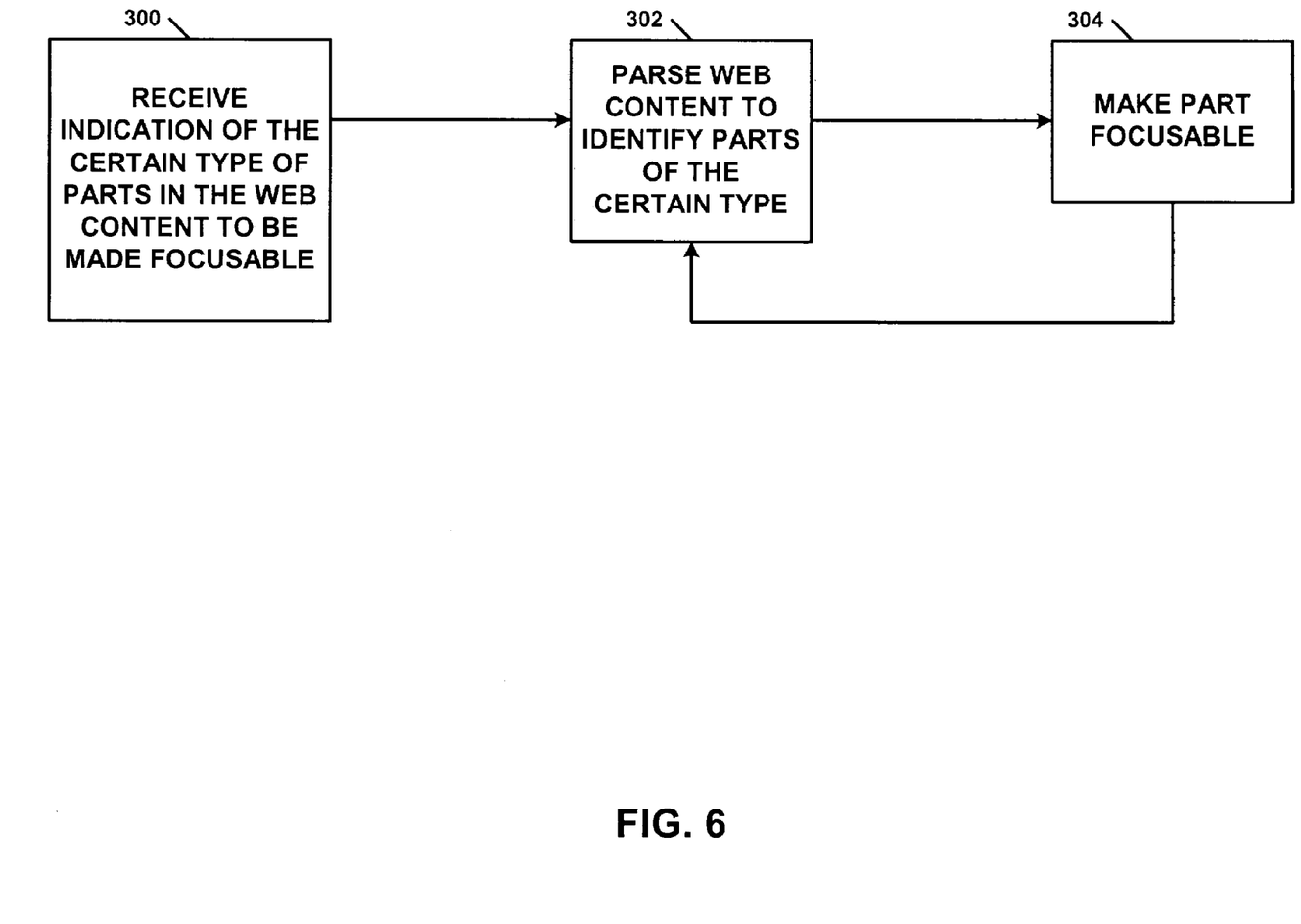
FIG. 6 is a flow chart illustrating a process for converting a non-focusable object into one or more focusable objects.

FIG. 6 is a flow chart illustrating a process for converting an otherwise non-focusable object into the focusable objects. Conversion of the otherwise non-focusable object into the focusable objects may involve identifying parts that are of a certain type within the markup language defining the non-focusable object. Those parts that are of the certain type may be presented to the user as focusable objects, rather than the non-focusable objects. As a result, the user may be able to select one or more of the focusable object and copy the one or more focusable objects into a more permanent medium, e.g., memory or file storage, and/or into another application, e.g., e-mail application, instant messaging application, or editor.

The conversion of the non-focusable object into the focusable objects may begin at step 300. A non-focusable object in a form of the block of text 112 may be defined by parts in the form of, e.g., characters, words, sentences, paragraphs, pages, figures, tables, graphics, or icons. At step 300, the processor 54 may receive indication of a certain type of the parts to be made focusable. The certain type of the parts may be characterized, for example, as characters, words, sentences, paragraphs, pages, figures, tables, graphics, or icons. The certain type may be received as a result of a choice-item of a menu being selected by the user or a softkey being actuated, but other arrangements are also possible. For example, the certain type may be predefined, and thus already stored in the memory 56.

At step 302, the processor 54 may go through, i.e., parse, the markup language defining the non-focusable object, to identify and separate the parts of the non-focusable object that are of the certain type. For example, the non-focusable object may be defined by characters. If the certain type of parts to be identified is a word, then the processor 54 may extract a character from the non-focusable object and determine whether the character is a space. If the character is not a space, then a next character is extracted. Successive characters are extracted from the non-focusable object until a space is found. If the character extracted is a space, then the characters that have been extracted thus far define a word. The part, i.e., word, may be made focusable at step 304. The part may be made focusable by, for example, associating the part with a tag that indicates to the browser application that the part is focusable. The steps 302, 304 may be repeated until the parts in the non-focusable object that are of the certain type are made focusable.

Figure 7:
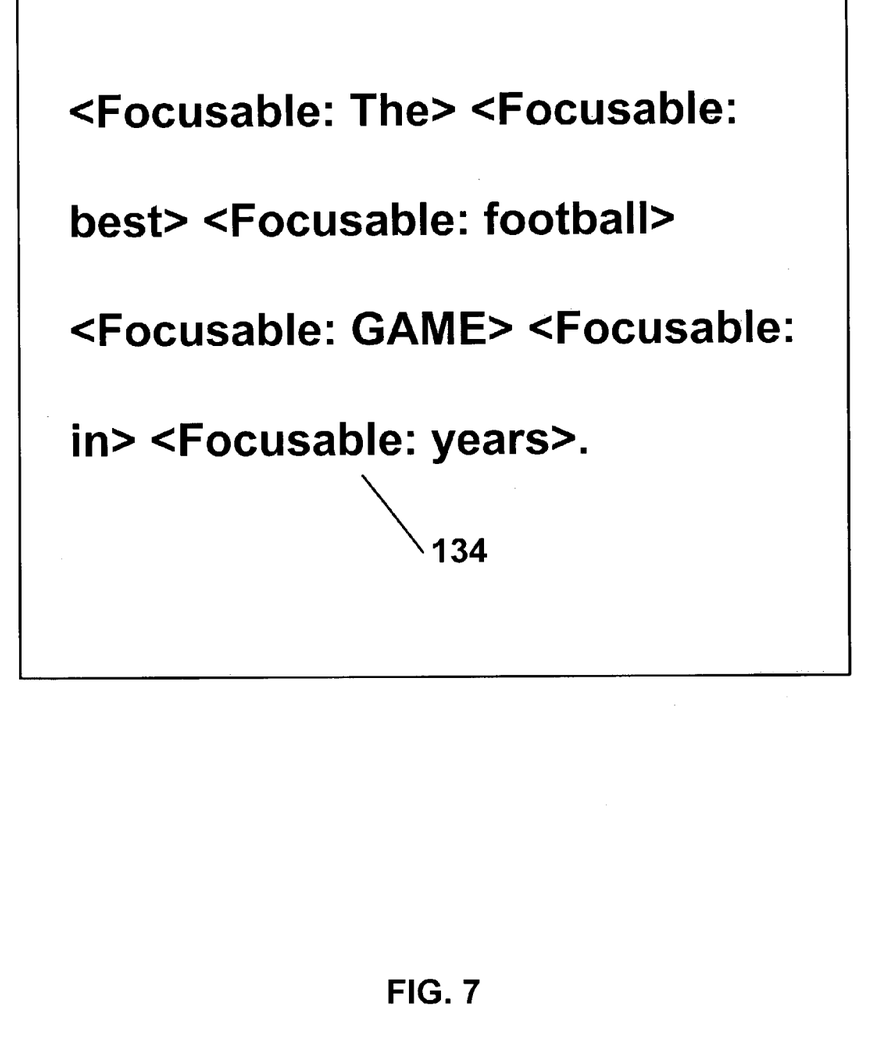
FIG. 7 illustrates exemplary markup language produced as a result of a block of text being made focusable.

FIG. 7 illustrates exemplary markup language of card resulting from the processor 54 converting the block of text 112, a non-focusable object, into focusable objects in the form of words. Each word in the block of text may be associated with a "focusable" tag 134. The focusable tag may result in the browser application being programmed to display each of the words in the block of text as focusable. Of course, arrangements other than use of a "focusable tag" are also possible for programming the browser application to present the words as focusable objects.

Specifics on how conversion of the non-focusable object into the focusable objects occurs can vary with the type of the non-focusable object being converted and functionality of the browser application. The above example describes making words focusable. Alternatively, a non-focusable object in the form of a spread sheet may be made up of cells. If the non-focusable object takes the form of a spread sheet, rather than a block of text, then the processor 54 may parse the spreadsheet, identify the cells within the spreadsheet, and make focusable those cells identified. And the card resulting from the conversion may have the cells associated with the focusable tags. Other ways to convert the non-focusable object into the focusable object are also possible, depending on the type of non-focusable object and the type of the focusable object. The conversions described above in no way limits the exemplary embodiments of the present invention.

Additionally, the browser application may be programmed to perform the conversion from the non-focusable object into the focusable objects, itself. The intermediate step of generating the card that defines the focusable object need not be performed. For example, the browser application may ignore presence or absence of a tag in the markup language defining a card, and present the card with the web content of a certain type as focusable objects. Alternatively, the server 20 may convert the non-focusable object into focusable object and send the card defining the non-focusable object to the client terminal 12. Other variations are also possible for performing the conversion from the non-focusable object to the focusable object, consistent with the exemplary embodiments of the present invention.

Figure 8:
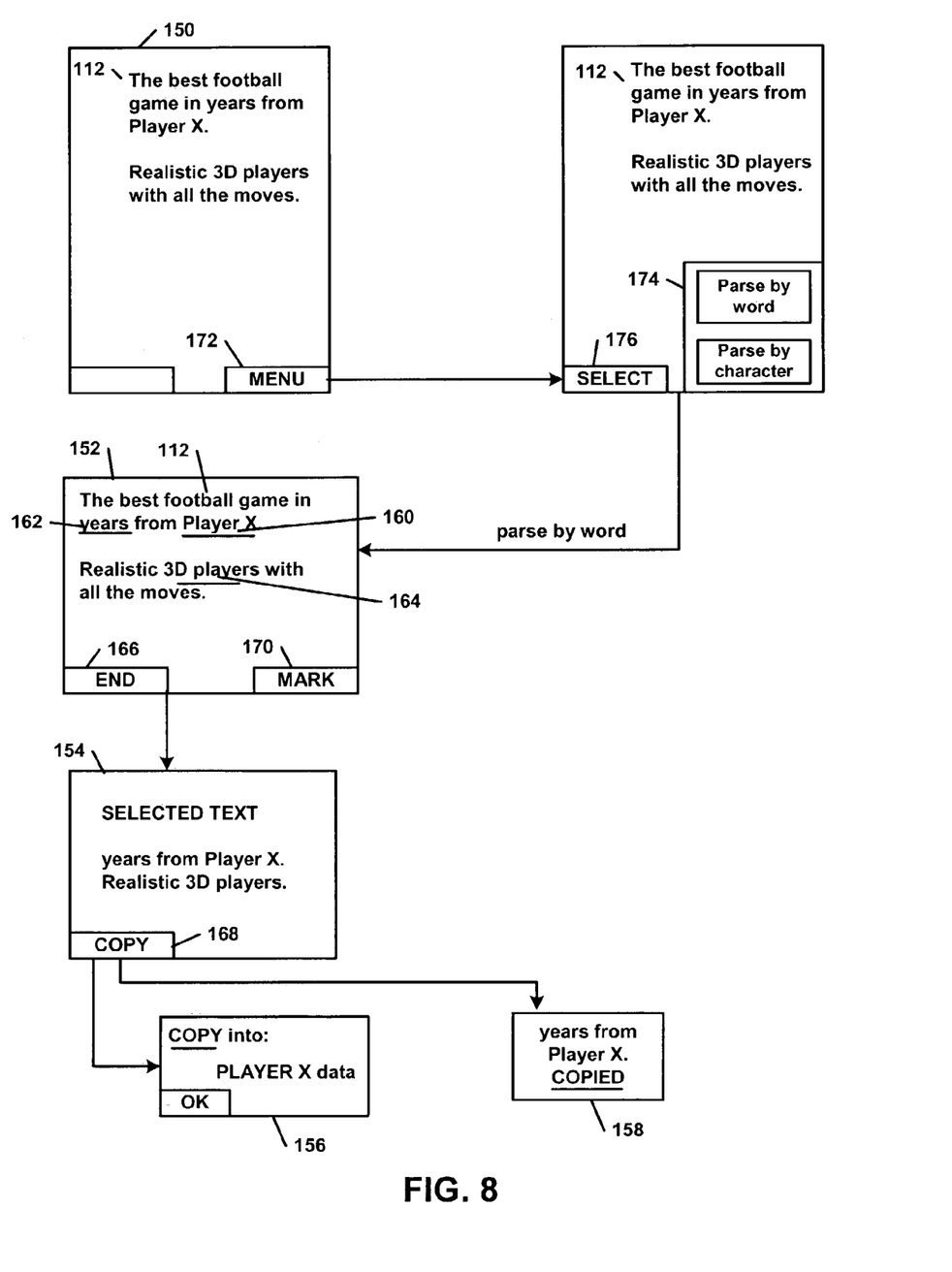
FIG. 8 is a screen flow illustrating user-interaction with a browser application to select a portion of the block of text.
Figure 9:
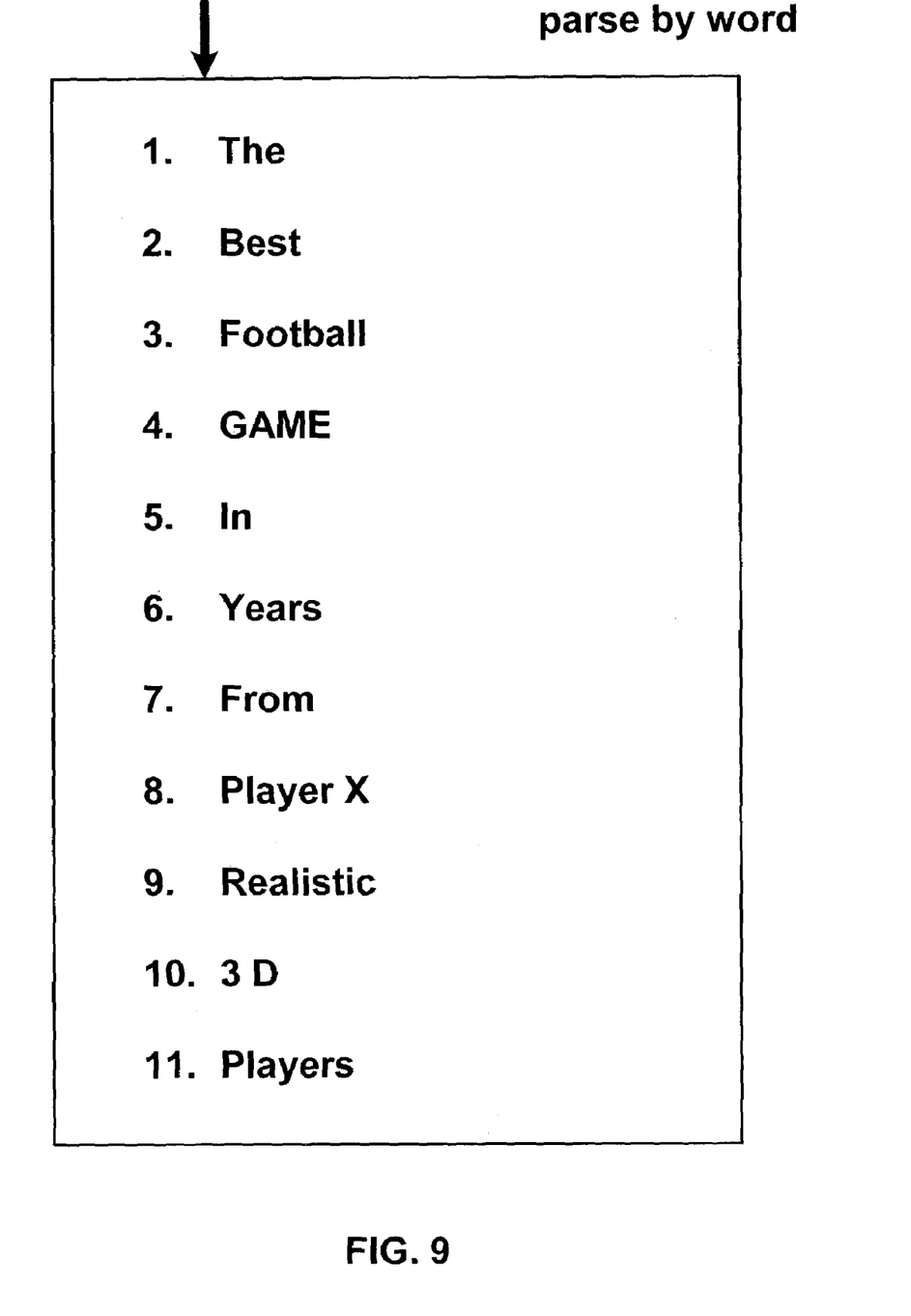
FIG. 9 illustrates an alternative presentation of the block of text made focusable on the client terminal.
Figure 10:
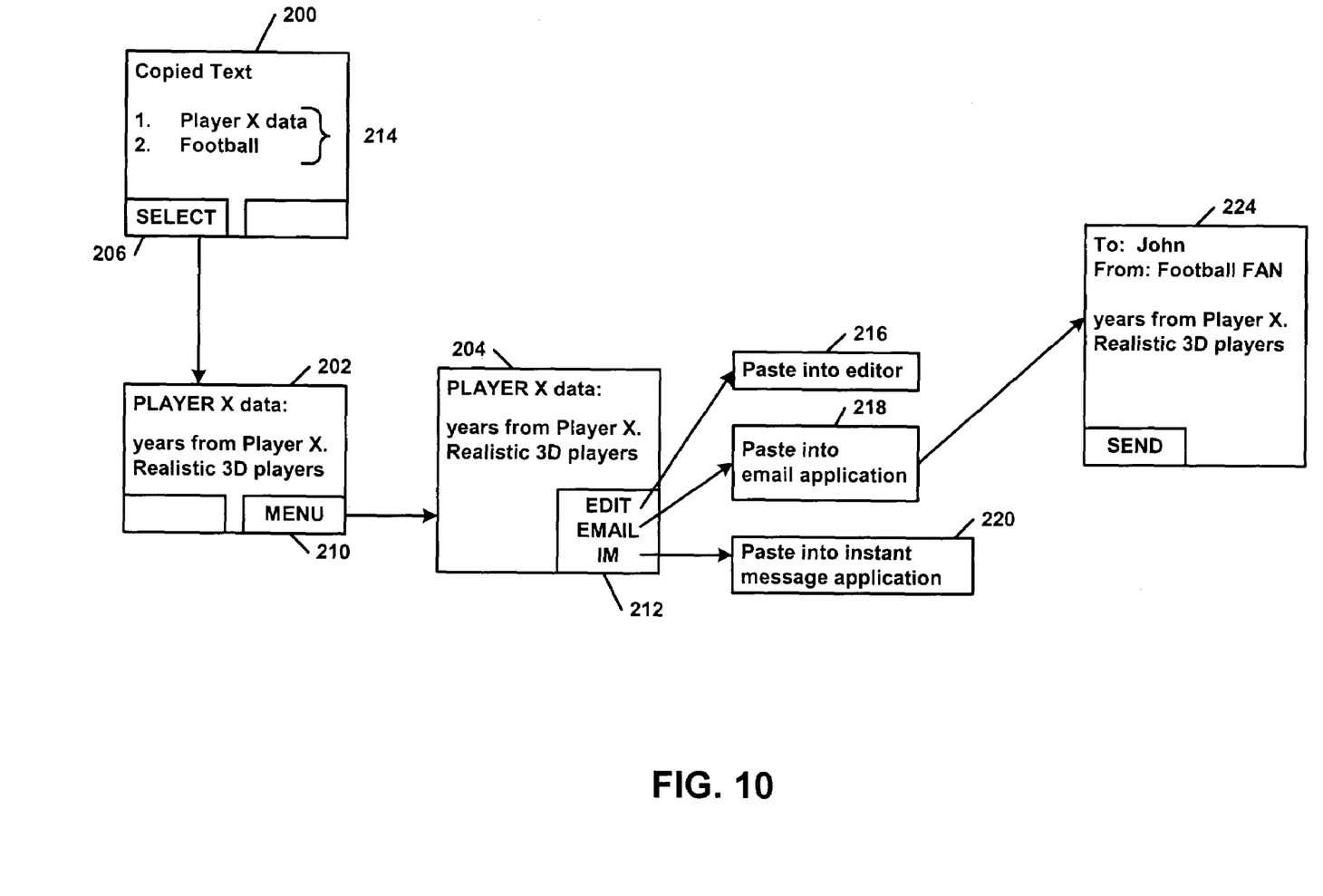
FIG. 10 is another screen flow illustrating user-interaction with the browser application to copy the portion of the block of text into another application.

FIGS. 8–10 are screen flows illustrating an exemplary process for selecting and copying a portion of the non-focusable object in accordance with the exemplary embodiment of the present invention. The screen flows are exemplary in nature. The browser application may present cards in addition to, or instead of, those illustrated to perform the process of selecting and copying the portion of the non-focusable object.

FIG. 8 is an exemplary screen flow illustrating user-interaction with a browser application to "select" a portion of a non-focusable object.

The user may select a menu option, e.g., text copy/paste as shown by menu 104 in FIG. 4, to invoke functionality to select a portion of the non-focusable object. The browser application may be programmed to present card 150 in response to the menu option being selected. The card 150 may define the block of text 112 as a non-focusable object.

Additionally, the card 150 may have a menu label 172 above softkey 44. By actuating the softkey 44 below the menu label 172, the browser application may present menu 174. The menu 174 may allow the user to identify the certain type of the parts defining the non-focusable object, e.g., the block of text 112, to be made focusable. For example, the user may select the certain type to be a character. Alternatively, the user may select the certain type to be a word. The user may indicate selection of the certain type by scrolling the certain type, i.e., the word or the character, under a highlight or cursor, for example, in the menu 174 and pressing the softkey 42, below label 176, to select the certain type, but other arrangements are also possible.

In response to the certain type being selected, the browser application may parse the non-focusable object for the parts of the certain type and present card 152 in which the parts of the non-focusable object are made focusable. In this example, the block of text 112 may be parsed into words that are made focusable. By making the words focusable, the user may indicate selection of a portion of the once non-focusable object. The browser application may be programmed to allow the user to scroll through the focusable object, e.g., words, use a cursor to mark a start position 162, e.g., a start word, and an end position 164, e.g., an end word, within the block of text 112. For example, the user may use the navigation keys or some other type of input mechanism to scroll the cursor 160 to the start position 162, press the soft key 44 below label 170 to mark the start position 162, scroll the cursor 160 to a stop position 164, and press the softkey 44 again to mark the stop position 164. The words between the start position 162 and the stop position 164 may indicate the one or more focusable objects selected. Other arrangements are also possible for marking the selected focusable objects depending on the certain type of the parts made focusable.

The browser application may allow the user to copy the one or more focusable objects selected from temporary cache, for example, into a more permanent, fixed medium, for example, the memory 56 or file storage 58. The user may press the softkey 42 below a label 166 to end selection and copy the one or more focusable objects selected from the temporary cache into the more permanent, fixed medium. The browser application may present card 154 to identify the one or more focusable objects selected. The one or more focusable objects selected may be copied into the memory 56 or into the file storage 58 by pressing the softkey 42 above label 168. The browser application may also confirm the copying of the one or more focusable objects selected by presenting card 158.

Optionally, the user may be able to enter, for example, by the alphabetic or the numeric keypad, a file name under which the one or more focusable objects selected is to be copied. The file name may be used, as described below, to subsequently identify the one or more focusable objects that are copied into the more permanent, fixed medium. The browser application may present card 156 to enter the file name, e.g., "Player X Data," under which the one or more focusable objects selected are to be copied. And by pressing the softkey 42 under a label 170, the browser application may copy the one or more focusable objects selected into a file identified by the file name. Then, the browser application may confirm copying the one or more focusable objects selected by presenting the card 158. Other arrangements are also possible.

FIG. 9 illustrates an alternative presentation of the block of text made focusable on the client terminal. After converting the non-focusable object into focusable object and instead of presenting card 152, the browser application may present the focusable objects in the block of text 112 as a list of the words. The user may scroll the cursor or the highlight, for example, through the list to select an object. The list may be choice-items, i.e., focusable objects, in a choice card. Alternatively, the browser application may allow the user to define a start indication and an end indication, as described above in the context of the block of text 1112, to define a plurality of objects in the list to be selected. Still alternatively, the browser application may allow the user to enter in, e.g., number, that corresponds to the focusable objects to be selected. At least one focusable object may correspond to the number that the user can enter into the client terminal using the text-entry keypad. Other variations for presenting and selecting the focusable objects are also possible depending on the type of the focusable objects, consistent with the exemplary embodiments of the present invention.

Additionally or alternatively, in accordance with the exemplary embodiment of the present invention, the one or more focusable objects that are selected may be copied into other applications. The other applications may include, for example, e-mail applications, instant messaging applications, or editor applications.

FIG. 10 is an exemplary screen flow that illustrates an exemplary process for copying the one or more focusable objects selected from the once non-focusable object into another application.

The browser application may present card 200 which defines a list 214. The list 214 may identify, as choice-items, file names or first few characters of the one or more focusable objects previously copied into the memory 56 or the file storage 58, but other arrangements are also possible. The browser application may be programmed to allow the user to select a choice-item from the list 214 so as to view the one or more focusable objects associated with the file name. For example, the user may select the choice-item "Player X Data" from the list 214. The browser application may present a card 202, which identifies the one or more focusable objects associated with the choice-item.

Additionally, the browser application may be programmed to copy the one or more focusable objects associated with the choice-item selected into another application. The browser application may display a label 210. By pressing the softkey 44 below the label 210, the browser application may present a menu 212 in card 204. The menu 212 may identify a plurality of applications capable of running on the client terminal 12. The browser application may allow the user to scroll a menu option under a highlight and select an application from the menu 212. As a result, the one or more focusable objects associated with the choice-item selected from card 200 may be transferred into the application selected from menu 212. For instance, the parts may be copied, i.e., "pasted" into an editor, an e-mail application, or an instant message application, as shown by blocks 216, 218, and 220, respectively. For example, card 224 shows the one or more focusable objects being copied into an e-mail application.

Other arrangements are also possible for copying the one or more objects selected. For instance, the one or more objects selected may be copied directly into another application, instead of being first saved into the fixed medium and then copied into the other application. Additionally, only a last one or more focusable objects selected may be copied into the other application, instead of the user being able to select from the list 214 one or more focusable objects to be copied. Still other arrangements are also possible consistent with the exemplary embodiments of the present invention.

Exemplary embodiments of the present invention have thus been illustrated and described. It will be understood, however, that changes and modifications may be made to the invention as described without deviating from the spirit and scope of the invention, as defined by the following claims.

We claim:

1. A process for converting a non-focusable object into a focusable object, the process comprising:
   receiving content that defines a given non-focusable object;
   presenting the at least one given non-focusable object on the display screen;
   parsing the given non-focusable object into a plurality of parts of a certain type;
   establishing as at least one given focusable object, the parts that are of the certain type;
   presenting the at least one given focusable object as a list on the display screen; and
   determining user-selection of one or more of the at least one given focusable object from the list.

2. In a client terminal of a type comprising a processor, memory, and an input mechanism, the processor executing computer instructions stored in the memory, the computer instructions defining, in part, a browser application, the browser application being arranged to present focusable objects and non-focusable objects on the client terminal, and wherein actuation of the input mechanism enables a user to scroll to any focusable object presented by the browser application, but not to scroll to any non-focusable object, a method comprising:
   receiving content that defines at least one given non-focusable object;
   converting one or more of the at least one given non-focusable object into at least one given focusable object, wherein converting the one or more of the at least one given non-focusable object into the at least one given focusable object comprises parsing the at least one given non-focusable object into a plurality of parts of a certain type and establishing as the at least one given focusable object, the parts that are of the certain type;
   presenting the at least one given focusable object on the display screen; and
   detecting, by actuation of the input mechanism, user-selection of one or more of the at least one given focusable object.

3. The method of claim 2, fiber comprising copying the one or more of the at least one given focusable object selected.

4. The method of claim 3, wherein copying the one or more of the at least one given focusable object selected comprises copying the one or more of the at least one given focusable object selected into a fixed medium.

5. The method of claim 3, wherein copying the one or more of the at least one given focusable object selected comprises copying the one or more of the at least one given focusable object selected into a user-application.

6. The method of claim 5, wherein the user-application is selected from the group consisting of e-mail application, an instant messaging application, and an editor.

7. The method of claim 2, wherein detecting the user-selection of the one or more of the at least one given focusable object comprises detecting a start indication and a stop indication, the start indication defining a first focusable object of the at least one given focusable object and the stop indication defining a second focusable object of the at least one given focusable object, whereby the one or more of the at least one focusable object are focusable objects between the first focusable object and the second focusable object.

8. The method of claim 2, wherein the certain type is selected from the group consisting of letters, words, sentences, paragraphs, pages, tables, and cells.

9. The method of claim 2, wherein converting the one or more of the at least one given non-focusable object into the at least one given focusable object comprises:
   presenting on the client terminal a user-selectable menu option for converting the one or more of the at least one given non-focusable object into the at least one given focusable object; and
   in response to the user-selection of the menu option, converting the one or more of the at least one given non-focusable object into the at least one given focusable object.

10. The method of claim 2, wherein the client terminal is a wireless device.

11. The method of claim 2, wherein the input mechanism is navigation keys.

12. The method of claim 2, wherein presenting the at least one given focusable object on the display screen comprises presenting a list of the at least one given focusable object on the display screen.

13. The method of claim 12, wherein detecting the user-selection of the one or more of the at least one given focusable object comprises detecting the user-selection of the one or more of the at least one given focusable object from the list of the at least one given focusable object.

14. In a client terminal of a type comprising a processor and memory, the processor executing computer instructions stored in the memory, the computer instructions defining, in part, a browser application, the browser application being arranged to present focusable objects and non-focusable objects on the client terminal, wherein the browser application enables user-selection of any focusable object, but does not allow user-selection of any non-focusable object, a method comprising:

receiving content that defines at least one given non-focusable object;

converting one or more of the at least one given non-focusable object into at least one given focusable object, wherein converting the one or more of the at least one given non-focusable object into the at least one given focusable object comprises parsing the at least one given non-focusable object into a plurality of parts of a certain type and establishing as the at least one given focusable object, the parts that are of the certain type;

displaying the at least one given focusable object on the terminal; and receiving the user-selection of one or more of the at least one given focusable object.

15. A terminal comprising:

a processor;

memory;

an input mechanism;

a first set of computer instructions stored in the memory and executable by the processor, the first set of computer instructions defining a browser application arranged to present focusable objects and non-focusable objects on the terminal, wherein action of the input mechanism enables a user to scroll to any focusable object presented by the browser application, but not to scroll to any non-focusable object;

a second set of computer instructions stored in the memory and executable by the processor to perform the functions of:

receiving content which defines at least one given non-focusable object;

converting one or more of the at least one given non-focusable object into at least one given focusable object, wherein converting the one or more of the at least one given non-focusable object into the at least one given focusable object comprises parsing the at least one given non-focusable object into a plurality of parts of a certain type and establishing as the at least one given focusable object the parts at are of the certain type;

presenting, on a display screen of the terminal, the at least one given focusable object; and detecting, by actuation of the input mechanism, the user-selection of one or more of the at least one given focusable object.

16. The terminal of claim 15, wherein the second set of computer instructions further comprises computer instructions executable by the processor for performing the functions of copying the one or more of the at least one given focusable object selected.

17. The terminal of claim 16, wherein the second set of computer instructions executable for copying the one or more of the at least one given focusable object selected comprises computer instructions for copying the one or more of the at least one given focusable object selected into a fixed medium selected from the group consisting of memory and file storage.

18. The terminal of claim 16, wherein the second set of computer instructions executable for copying the one or more of the at least one given focusable object comprises computer instructions for copying the one or more of the at least one given focusable object into a user-application.

19. The terminal of claim 18, wherein the user-application is selected from the group consisting of e-mail application, an instant messaging application, and an editor.

20. The terminal of claim 15, wherein the input mechanism is defined by at least one navigation key.

21. The terminal of claim 15, wherein the certain type is selected from the group consisting of letters, words, sentences, paragraphs, pages, tables, cells, graphics and icons.

22. The terminal of claim 15, wherein the second set of computer instructions for converting the one or more of the at least one given non-focusable object into the at least one given focusable object further comprises computer instructions executable by the processor for performing the functions of:

presenting, on a display screen of the client terminal, a user-selectable menu option for converting the one or more of the at least one given non-focusable object into the at least one given focusable object; and in response to the user-selection of the menu option, converting the one or more of the at least one given non-focusable object into the at least one given focusable object.

23. The terminal of claim 15, wherein the content is defined by a card.

24. The system of claim 15, wherein the second set of computer instructions executable for presenting the at least one given focusable object on the display screen comprises computer instructions for presenting a list of the at least one given focusable object on the display screen.

25. The system of claim 24, wherein the second set of computer instructions executable for detecting the user-selection of the one or more of the at least one given focusable object comprises computer instructions for detecting the user-selection of the one or more of the at least one given focusable object from the list of the at least one given focusable object.

26. A terminal comprising:

a processor;

memory;

a first set of computer instructions stored in the memory and executable by the processor, the first set of computer instructions defining a browser application arranged to present focusable objects and non-focusable objects on the terminal, wherein the browser application enables user-selection of any focusable object, but does not allow user-selection of any non-focusable object;

a second set of computer instructions stored in the memory and executable by the processor to perform the functions of:

receiving content which defines at least one given non-focusable object;

converting one or more of the at least one given non-focusable object into at least one given focusable object, wherein converting the one or more of the at least one given non-focusable object into the at least one given focusable object comprises parsing the at least one given non-focusable object into a plurality of parts of a certain type and establishing as the at least one given focusable object, the parts that are of the certain type;

displaying, on a display screen of the terminal, the at least one given focusable object; and receiving from an input mechanism, the user-selection of one or more of the at least one given focusable object.

* * * * *